United States Patent Office 3,256,360
Patented June 14, 1966

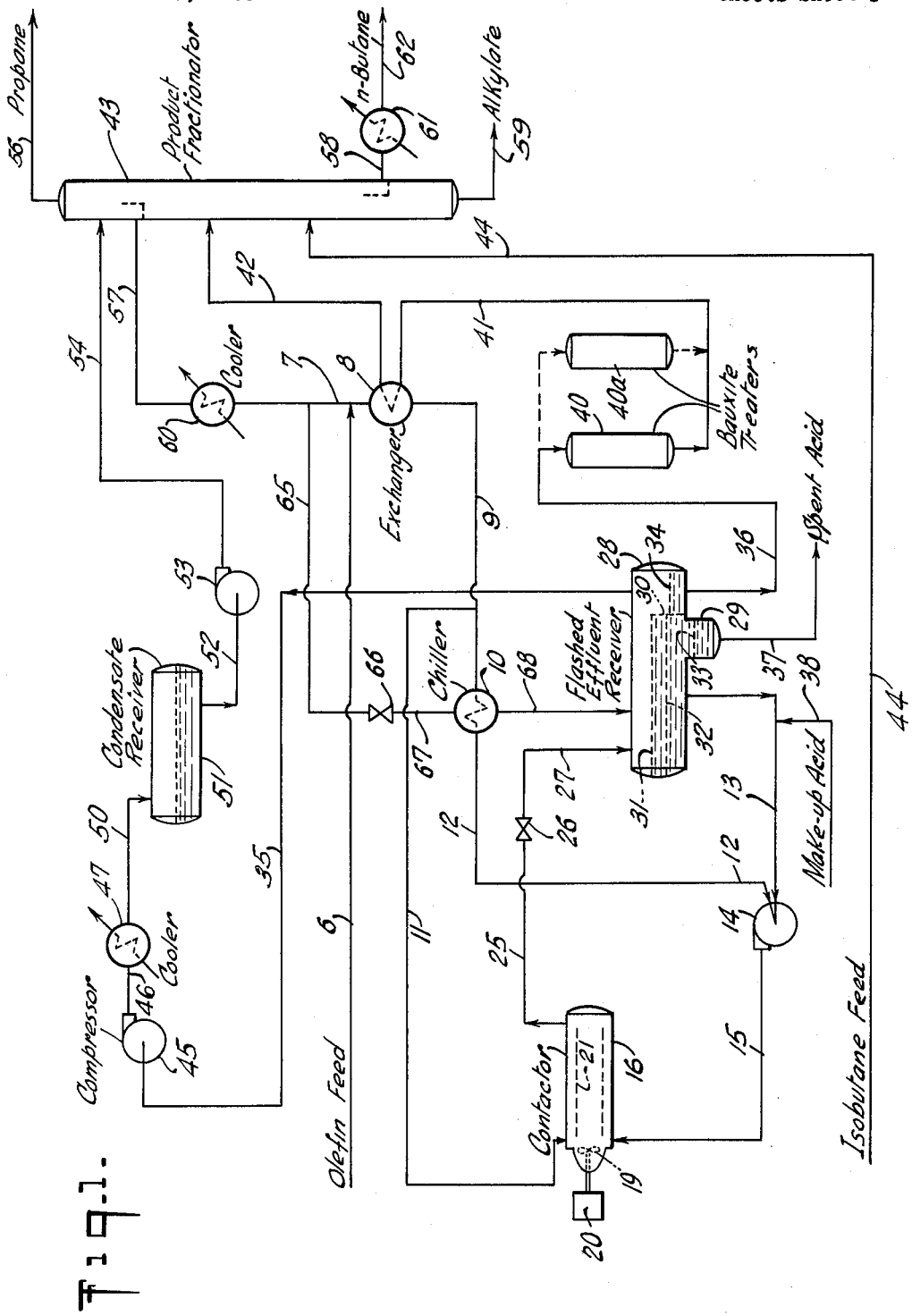

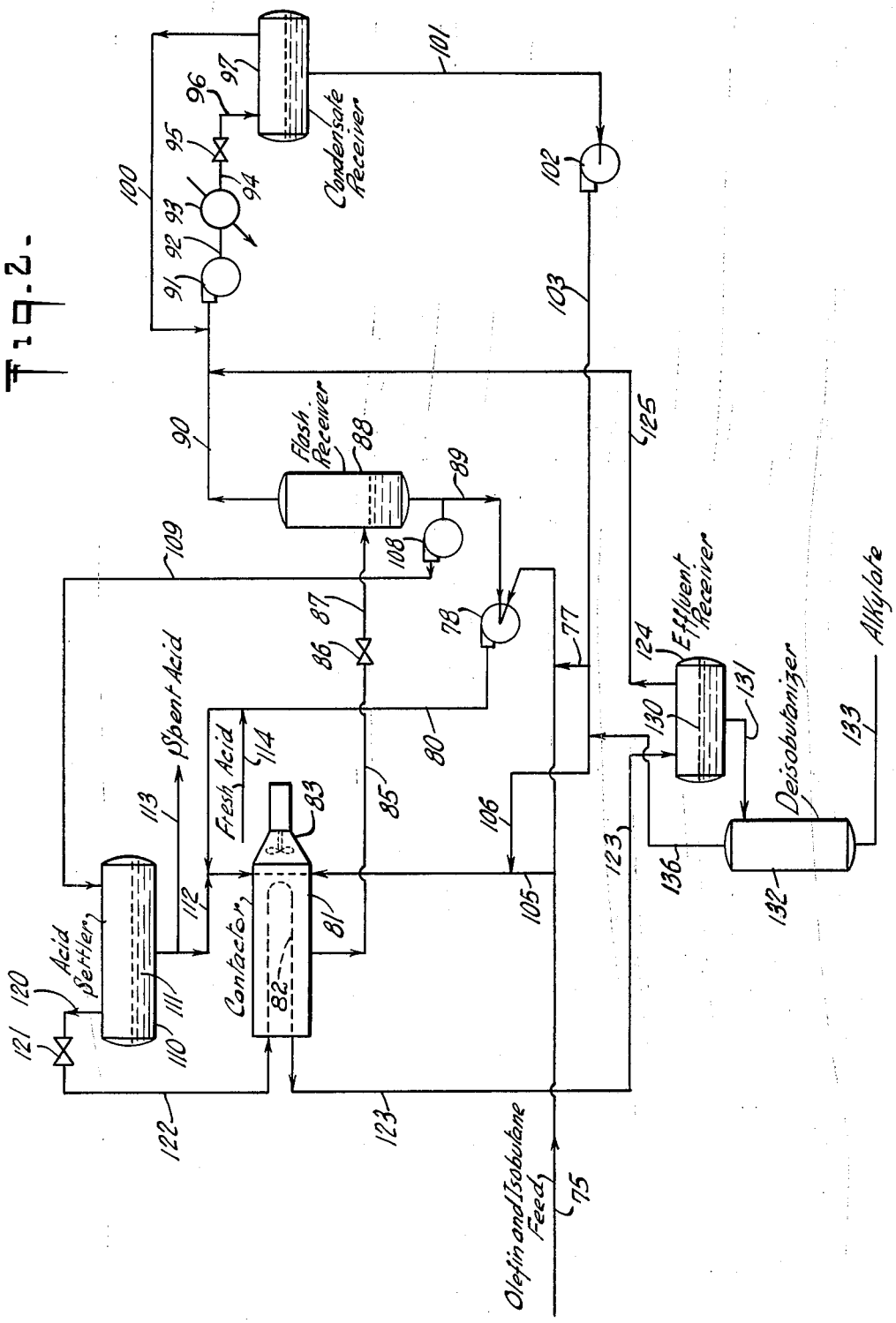

3,256,360
SULFURIC ACID ALKYLATION WITH CHILLED EMULSION RECYCLE
Arthur R. Goldsby, Chappaqua, N.Y., and James O. Francis, Houston, Tex., assignors to Texaco Inc., New York, N.Y., a corporation of Delaware
Filed Dec. 3, 1963, Ser. No. 327,786
8 Claims. (Cl. 260—683.62)

This invention relates to a hydrocarbon conversion process and more particularly to an alkylation process wherein an olefin feed is contacted with isobutane reactant and sulfuric acid catalyst in a zone of intense mixing and low temperature. In the alkylation of olefinic material with an isoparaffin in the presence of a sulfuric acid catalyst, the reactants are maintained in a liquid phase comprising a hydrocarbon and acid emulsion. Reaction products and unreacted isoparaffin are separated from an effluent stream withdrawn from the reaction zone. In accordance with this invention at least a portion of the emulsion effluent withdrawn from the reaction zone is passed to a flash zone effecting vaporization of a part of the hydrocarbon components of said emulsion and concomitant cooling of resulting vapor and remaining liquid emulsion, and at least a part of said cooled remaining emulsion is returned to said reaction zone effecting cooling thereof. Advantageously at least a part of the olefin feed is admixed with the cooled emulsion as it is passed to the reaction zone. Intense mixing of the olefin feed with the cooled recycle emulsion is effected by introducing the olefin into the pump returning the cooled emulsion to the reaction zone.

An advantage of the process of this invention is that the alkylation zone and the reactants are efficiently cooled by direct heat exchange whereby the provision of extensive indirect heat exchange surface is avoided. Another advantage of the process of this invention is that initial contact of the olefin reactant and catalyst is effected at a low temperature whereby undesired polymerization and catalyst decomposition reactions are avoided. An overall lower temperature may be obtained which results in a lower acid consumption, especially for units with limited refrigeration capacity. An important advantage is that existing units of limited capacity may be expanded at a minimum cost to obtain improved results. Other objects and advantages will be obvious from the following more detailed description of the apparatus and process.

In the catalytic alkylation of olefins with isoparaffins, a preponderence of isoparaffin typically about 70 to 80 volume percent or more of the hydrocarbons in the reaction mixture is used to direct the reaction towards production of the most valuable aviation or automotive fuels. Consequently, a quantity of isoparaffin must be recovered and recycled for reuse in the process. Isobutane is generally used as the isoparaffin for the manufacture of aviation or motor fuels although other isoparaffins, for example, isopentane, may be employed.

The alkylatable material reacted with isoparaffin is olefinic, that is, it is an olefinic hydrocarbon such as propylene, butylene, or the like, or an olefin acting material such polymer, codimer, or an alkyl ester, for example, an alkyl sulfate or a mixture comprising one or more of the foregoing.

In catalytic alkylation, the mole ratio of isoparaffin to olefinic material supplied to the reaction zone is maintained substantially in excess of 1:1, and preferably within the range of about 4:1 to 20:1. The catalyst to liquid hydrocarbon volume ratio is maintained within the range of about 0.5:1 to about 5:1 and preferably within the range of 1:1 to about 3:1. Catalyst strength is maintained of at least about 85 percent sulfuric acid and preferably within the range of about 90 to 95 percent by purging spent acid from the system and by adding makeup acid of about 98.0 to about 99.9 percent purity.

A substantial portion of the isoparaffin employed in the alkylation process is obtained by condensing and returning a portion of the light hydrocarbons evaporated from the reaction mixture in effecting cooling. Isoparaffin reactant remaining in the liquid reaction mixture is separated by fractional distillation recovering a distillate of high isoparaffin concentration, for example, about 85 to 90 liquid volume percent isobutane which is recycled to the alkylation zone. The high boiling alkylate in such distillation is recovered as the liquid bottoms fraction. This liquid bottoms fraction may be redistilled in conventional manner to separate alkylate fractions for use as fuel blending stocks. Advantageously, the liquid products may be charged directly to the top of the deisoparaffinizing zone and the isoparaffin separated by a stripping distillation. In such a stripping distillation, a side stream of normal paraffin, for example, normal butane, may be withdrawn. It is also customary to employ distillative separation to prevent accumulation of other diluents in recycled isoparaffin, for example, to depropanize isobutane recycle.

In the reaction zone, conditions of rapid mixing and high ratio of isoparaffin to olefinic material are maintained to promote the desired alkylation reaction and avoid reactions such as conjunct polymerization which lead to lower product quality and catalyst degradation. The reaction zone must be cooled to remove the exothermic heat of the alkylation reaction and to maintain desired alkylation temperatures within the range of about 15 to 75° F. In accordance with the present invention, the reaction zone is cooled, at least in part, by flashing a portion of the effluent liquid emulsion to a temperature within the range of about 0 to 40° and preferably within the range o fabout 0 to 30° F. and recycling a portion of the thus cooled emulsion to the reaction zone. Preferably the olefinic feed is introduced into the flashed emulsion whereby it is initially contacted with isoparaffin and acid at a temperature substantially below the alkylation reaction temperature. The emulsion may be flashed to a temperature within the range of about 15 to 50° F. below the reaction temperature when all reactor cooling is effected with cold emulsion recycle. Flashing to temperature of about 10 to 20° below reaction temperature may be employed when a portion of the reaction cooling is effected by cooling the hydrocarbon feed streams or by indirect heat exchange of the reaction zone. It has been found that a lower temperature in alkylation favors lower acid consumption. This is especially true for the alkylation of isobutane with butylenes. The present invention offers a relatively inexpensive method for taking advantage of this, that is, operating at a lower alkylation temperature, and also splitting the olefin feed which is also beneficial.

Intimate mixing of the olefin feed with the cooled emulsion passed to the reaction zone may be effected by combining the olefin and cooled emulsion in the pump employed to recycle the cooled emulsion to the reaction zone. When introducing the olefin feed into the suction of the emulsion return pump it is desirable to cool the olefin to a temperature of at least as low as its bubble point at suction pressure to avoid vaporization in the pump. The olefin may be cooled by indirect heat exchange or advantageously by combining it with a stream of cold isoparaffin rich liquid resulting from condensing and reflashing isobutane rich vapors from emulsion flashing.

The accompanying drawings diagramatically illustrate the process of this invention. Although the drawings illustrate arrangements of the apparatus in which the process of this invention may be practiced, it is not intended to limit the invention to the particular apparatus or materials described.

FIG. 1 illustrates an embodiment of this invention wherein the cooling load of the reaction zone is provided by recycling cold emulsion and cooling the feed streams.

FIG. 2 illustrates an embodiment of this invention wherein a part of the cooling of the reaction zone is effected by indirect heat exchange.

Referring to FIG. 1, a mixed olefin feed stock comprising butylenes and propylene is passed through line 6 and mixed with isobutane in line 7. The combined isobutane-olefin feed mixture is cooled by indirect heat exchange with product effluent in exchanger 8 and passed through line 9 to chiller 10 where it is chilled by indirect heat exchange with flashed isobutane. The isobutane-olefin feed stream from chiller 10 is passed through line 12 and introduced with cold emulsion from line 13 into the suction of emulsion recycle pump 14. If desired, a portion of the isobutane-olefin feed in line 9 may be passed directly to contactor 16 through line 11. The hydrocarbon feed and emulsion are quickly and thoroughly mixed in pump 14 and the resulting cold emulsion is passed through line 15 to contactor 16.

Contactor 16 is an agitated reaction vessel wherein intimate contact of the reactants in catalyst is maintained while time is provided for completion of the alkylation reaction. The contactor is provided with means to effect agitation which may be, for example, a propeller 19 driven by a motor 20. Circulation throughout the entire reaction zone may be facilitated by the use of a draft tube 21 which may be a cylindrical wall within the reaction zone running the length of the contactor so that fluid flows through the draft tube and then through the annular passage formed by the walls of the draft tube and the contactor.

A portion of the reaction mixture in emulsion form is withdrawn through line 25 and passed through throttle valve 26. Pressure is released in passing through valve 26 permitting a portion of the hydrocarbon components of the emulsion to flash or evaporate thereby chilling the resulting vapor-remaining emulsion mixture. The chilled mixture of vapor and emulsion is discharged through line 27 to effluent receiver 28. Receiver 28 comprises a horizontal vessel provided with a weir 30 and an acid withdrawal well 29. The mixture discharged into receiver 28 separates immediately into emulsion and vapor fractions and the vapor is withdrawn through line 35. The liquid emulsion introduced into receiver 28 is confined by weir 30 and settles to the bottom of receiver 28 and forms a separate emulsion phase having an upper level at interface 32. Emulsion for recycle is withdrawn through line 13. Hydrocarbon separates from the emulsion forming a hydrocarbon phase having an upper level 31 and a lower level at interface 32. Hydrocarbon phase overflows weir 30 and collects in the end compartment of receiver 28 indicated by level 34. Hydrocarbon is continuously withdrawn through line 36. A relatively small amount of acid separates from the emulsion phase and collects in well 29 forming an interface 33 between the acid and emulsion. This acid is withdrawn through line 37 for recovery or refortification. Makeup acid is introduced through line 38 to maintain system acid concentration and purity.

Liquid product in line 36 is passed through bauxite treater 40, line 41 and heat exchanger 8. Bauxite treating tower 40 is paired with tower 40a to permit alternate processing and regeneration of the bauxite without interruption of the product flow. The liquid product, after use to cool the hydrocarbon feed by indirect heat exchange in exchanger 8, is passed through line 42 to product fractionator 43.

Isobutane feed, which may have been treated for sulfur and mercaptan removal by caustic washing and for water removal by passing through a salt filter in facilities not shown, is passed through line 44 to product fractionator 43. Gases from line 35 are compressed with compressor 45 and the compressed gases are passed through line 46 to cooler 47. Resulting condensate is passed through line 50 to condensate receiver 51. Condensate from receiver 51 is withdrawn through line 52 and passed by means of pump 53 and line 54 to the top of product fractionator 43.

Product fractionator 43 is employed as a multi-purpose distillation tower separating propane as overhead distillate withdrawn through line 56, isobutane as a side stream withdrawn through line 57, normal butane as a side stream withdrawn through line 58, and debutanized alkylate as bottoms withdrawn through line 59. Isobutane in line 57 is cooled in cooler 60 to supply cold isobutane feed in line 7. Normal butane is cooled in cooler 61 and discharged as a product through line 62. A portion of the isobutane in line 7 is passed through line 65 to valve 66 where the pressure is reduced and a portion of the isobutane flashed. The resulting chilled vapor-liquid mixture is passed through line 67 to provide cooling medium for chiller 10. Effluent isobutane liquid and vapor from chiller 10, after being used for cooling, is passed through line 68 and discharged into flashed effluent receiver 28 for separation and further handling with the vapor and liquid streams therein.

Referring to FIGURE 2, olefin and isobutane feed in line 75 is combined with cold condensate from line 77 and the combined stream introduced into the pump suction of emulsion recycle pump 78. Cold emulsion from flash receiver 88 is passed through line 89 and combined with the cold hydrocarbon stream in emulsion recycle pump 78 whereby the emulsion is rapidly and efficiently mixed with the hydrocarbon feed stream. The resulting hydrocarbon-catalyst emulsion is discharged through line 80 to contactor 81. Contactor 81 is a reactor provided with an internal indirect heat exchange coil 82 and agitating means 83.

A portion of the emulsified reaction mixture is withdrawn through line 85 and passed through flash valve 86 where the pressure is reduced effecting vaporization of part of the hydrocarbon constituents of said emulsion and cooling of the resulting vapor-liquid mixture. The vapor-liquid mixture is discharged through line 87 to flash receiver 88. Vapor and chilled emulsion are separated in receiver 88 and the vapor discharged through line 90 to compressor 91. Compressed vapors are passed through line 92 to condenser 93 wherein the vapors are condensed. Resulting condensate in line 94 is flashed through valve 95 effecting chilling of resulting vapor and isobutane condensate. The chilled condensate is discharged through line 96 to condensate receiver 97 wherein vapors and liquid are separated. The separated flashed vapors are withdrawn through line 100 and combined with the vapors in line 90 for recycle. Chilled condensate is passed through line 101, pump 102, and line 103 to supply the chilled isobutane condensate combined with the feed in line 75. The accumulation of propane in the condensate system may be prevented by depropanizing at least a portion of the condensate in line 94 by conventional distillation means not shown.

A portion of the isobutane-olefin feed in line 75 may be passed directly to contactor 81 through line 105 in admixture with cold condensate from line 106. A portion of the cold emulsion in line 89 is passed by means of pump 108 and line 109 to acid settler 110. The emulsion in settler 110 separates into hydrocarbon and acid phases separated by a band of emulsion 111. Acid is withdrawn through line 112 and passed to contactor 81. A portion of the acid is withdrawn from line 112 through line 113 for recovery, or regeneration and fresh makeup acid is introduced to the system through line 114. Hydrocarbon phase from settler 110 is withdrawn through line 120 and passed through flash valve 121 wherein the pressure is reduced and a portion of the hydrocarbon evaporated effecting cooling of the resulting vapor-liquid mixture. The cooled vapor-liquid mixture is passed through line 122 to coil 82 and thence through line 123 to effluent receiver 124. Receiver 124 separates hydrocarbon vapors from the product liquid. Vapors are withdrawn through line 125 and combined with the vapors in line 90 for compression and recycle. Liquid, separated in receiver 124 having a level 130, is withrawn through line 131 and passed to the top of deisobutanizer tower 132. Deisobutanizer tower 132 is a distillation tower employed to separate isobutane distillate overhead which is withdrawn through line 136 and debutanized alkylate which is withdrawn as bottoms product through line 133. Isobutane distillate in line 136 is recycled to contactor 81 through lines 106 and 105.

EXAMPLE

Butylene feed stock at a rate of 6,787 barrels per day comprising 5.2 percent by volume of butylenes and 70 percent of isobutane at a temperature of 50° F. are charged to an alkylation reactor maintained at 45° F. and 55 pounds per square inch gauge. The emulsion effluent from the reactor is passed to a flash vessel at 0.5 pound per square inch gauge which also serves as a settler. 46,000 barrels per day of emulsion from the flash vessel at 25° F., containing about 35 percent of hydrocarbon are recycled to the alkylation reactor by means of a circulating mixing pump. 6,787 barrels per day of the same butylene feed stock comprising 5.2 percent by volume of butylenes is cooled at 25° F. and charged to the pump. The temperature in the pump rises to 35° F. due to the alkylation reaction.

In the above example approximately 50 percent of the 1,200 barrels per day of alkylate is made at about 35° F. and the rest at about 45° F. By operating in this manner the CFRR octane value of the overall alkylate is 96.2 and the acid consumption 0.25 pound per gallon of alkylate. When the 1,200 barrels per day of alkylate is made at 45° F. by charging all of the olefin to the alkylation reactor a CFRR octane value of 95.8 is obtained and the acid consumption is 0.35 pound per gallon of alkylate. When the 1,200 barrels per day of alkylate is made at 60° F. in a unit designed for 950 barrels per day at 45° F. by charging all of the olefin to the alkylation reactor, an octane value of 94.8 is obtained and the acid consumption is 0.49 pound per gallon of alkylate.

We claim:

1. In an alkylation process wherein an olefinic material and an isoparaffin are reacted in contact with a sulfuric acid alkylation catalyst in a reaction zone containing a reaction mixture maintained in liquid phase comprising a hydrocarbon and acid emulsion of reactants, alkylation products, diluents, and catalyst, said reaction zone is cooled to adsorb the exothermic heat of reaction, and emulsion effluent comprising a part of said reaction mixture is withdrawn from said reaction zone, the improvement which comprises:

passing at least a portion of said emulsion effluent to a flash zone effecting vaporization of a part of the hydrocarbon components of said emulsion and concomitant cooling of resulting vapor and remaining liquid emulsion to a temperature below the temperature of the reaction mixture in said reaction zone, separating said resulting vapor and said remaining liquid emulsion, and passing at least a portion of said remaining liquid emulsion at a temperature below the temperature of the reaction mixture in said reaction zone to said reaction zone effecting cooling thereof.

2. The process of claim 1 wherein at least a part of said olefinic material is admixed with said emulsion at a temperature below the temperature of the reaction mixture in said reaction zone and the resulting admixture is passed to said reaction zone effecting cooling thereof and introduction of olefinic material thereinto.

3. The process of claim 2 wherein said cooled emulsion is passed by a pump to said reaction zone and said olefinic material is admixed with said cooled emulsion in said pump.

4. The process of claim 3 wherein said olefinic material is cooled to a temperature at least as low as its vaporization temperature at the suction pressure of said pump before admixing with said cooled emulsion.

5. The process of claim 4 wherein said olefinic material is cooled by heat exchange with a cold isoparaffin rich liquid resulting from condensing and reflashing said resulting vapor.

6. The process of claim 5 wherein said heat exchange is effected by direct heat exchange by mixing said olefinic material and said cold isoparaffin rich liquid.

7. In an alkylation process wherein an olefinic material and an isoparaffin in molar excess are contacted with a sulfuric acid alkylation catalyst in a reaction mixture comprising an emulsion of hydrocarbon in an alkylation zone, said alkylation zone is maintained at a temperature within the range of 15 to 75° F. and at a pressure sufficient to maintain said hydrocarbon entirely in liquid phase, and emulsion effluent comprising a part of said reaction mixture is withdrawn from said alkylation zone, the improvement which comprises passing at least a portion of said emulsion effluent to a flash zone at a pressure below the vapor pressure of the lower boiling hydrocarbon constituents of said emulsion effluent effecting vaporization of a part of the lower boiling hydrocarbon constituents of said emulsion and concomitant cooling of resulting vapor and remaining liquid emulsion to a temperature below the temperature of said alkylation zone and within the range of 0 to 40° F., separating said resulting vapor and remaining liquid emulsion, and passing remaining liquid emulsion at a temperature below the temperature of said alkylation zone to said alkylation zone effecting cooling thereof.

8. The process of claim 7 wherein said remaining liquid emulsion at a temperature within the range of 0 to 40° F. is admixed with at least a portion of said olefinic material, and the combined stream is passed to said alkylation zone.

References Cited by the Examiner

UNITED STATES PATENTS

| | | | |
|---|---|---|---|
| 2,977,397 | 3/1961 | Putney | 260—683.48 |
| 3,121,126 | 2/1964 | Goldsby et al. | 260—683.62 |
| 3,160,673 | 12/1964 | Black et al. | 260—683.59 |

DELBERT E. GANTZ, *Primary Examiner.*

ALPHONSO D. SULLIVAN, *Examiner.*